| United States Patent [19] | [11] Patent Number: 5,818,206 |
|---|---|
| Titus et al. | [45] Date of Patent: *Oct. 6, 1998 |

[54] METHOD AND APPARATUS FOR AUTOMATICALLY DETECTING DEVICE SPECIFICATIONS AND PROVIDING A CORRESPONDING OPERATING VOLTAGE

[75] Inventors: Joshua Titus; Joseph Andrew Vivio; Daniel L. Bouvier, all of Austin, Tex.

[73] Assignee: Dell USA L.P., Austin, Tex.

[*] Notice: The term of this patent shall not extend beyond the expiration date of Pat. No. 5,637,991.

[21] Appl. No.: 631,974

[22] Filed: Apr. 15, 1996

Related U.S. Application Data

[63] Continuation-in-part of Ser. No. 426,390, Apr. 21, 1995, Pat. No. 5,637,991.

[51] Int. Cl.⁶ ............................................. G05F 1/445
[52] U.S. Cl. ............................ 323/285; 327/49; 323/282
[58] Field of Search .............................. 327/545, 77, 78, 327/89, 47, 49; 323/282, 285

[56] References Cited

U.S. PATENT DOCUMENTS

| | | | |
|---|---|---|---|
| 4,893,072 | 1/1990 | Matsumoto | 371/22.3 |
| 5,099,196 | 3/1992 | Longwell et al. | 371/25.1 |
| 5,325,053 | 6/1994 | Gasbarro et al. | 324/158 |
| 5,389,990 | 2/1995 | Nakamura | 324/158.1 |
| 5,497,110 | 3/1996 | Smith | 327/47 |
| 5,534,801 | 7/1996 | Wu et al. | 327/77 |
| 5,544,092 | 8/1996 | Gunther et al. | 364/271.9 |
| 5,637,991 | 6/1997 | Brown et al. | 323/282 |

*Primary Examiner*—Peter S. Wong
*Assistant Examiner*—Derek J. Jardieu
*Attorney, Agent, or Firm*—Akin, Gump. Strauss, Hauer & Feld, L.L.P.

[57] ABSTRACT

A power supply system for detecting an operating configuration of a device, such as a processor, and for providing a corresponding operating voltage to the device. The power supply system includes a configurable power supply receiving configuration signals and for providing an operating voltage having a level corresponding to the configuration signals. A frequency determination circuit, such as a speed jumper block, is provided for asserting a signal indicative of the operating frequency of the device. Also, a device configuration circuit receives a signal indicative of the operating frequency and also receives a signal indicative of a plane configuration of the device, and correspondingly asserts the configuration signals to correspond to one of a matrix or plurality of predetermined operating voltage levels. A method of detecting an operating configuration of a device and for asserting a corresponding operating voltage to the device includes steps of detecting a frequency of operation, detecting a plane configuration of the device and asserting an operating voltage to the device having a level corresponding to the operation frequency and the plane configuration.

21 Claims, 8 Drawing Sheets

METHOD AND APPARATUS FOR AUTOMATICALLY DETECTING DEVICE SPECIFICATIONS AND PROVIDING A CORRESPONDING OPERATING VOLTAGE

CONTINUATION DATA

This is a continuation-in-part of co-pending application Ser. No. 08/426,390 titled "Power Supply Including a Detection and Switch System for Uni-Plane and Split-Plane Devices" filed Apr. 21, 1995, whose inventors were Alan E. Brown, Joseph D. Mallory, Joshua Titus and Joseph Andrew Vivio, and which was assigned to Dell USA L.P., now U.S. Pat. No. 5,637,991.

FIELD OF THE INVENTION

The present invention relates to power supplies, and more particularly to automatically detecting a device's specifications and providing the appropriate supply voltage.

DESCRIPTION OF THE RELATED ART

Most chips or integrated circuits (ICs) typically derive power from a single voltage source, although this depends upon the particular functions of the IC. Microprocessors of personal computer systems, for example, are almost invariably powered from a single voltage source. However, for specific performance reasons, some manufacturers are providing devices which require two DC voltage sources having different amplitudes. For example, the new P55 family of microprocessors by Intel require separate I/O and core DC voltages for proper operation. A device requiring a single voltage source is referred to as a uni-plane device, while a device requiring two or more voltage sources is referred to as a split-plane device.

It is desirable to provide a single supply voltage to a uni-plane device or to provide more than one supply voltage to a split-plane device plugged into a single or common socket interface. Such a feature would allow either a uni-plane or split-plane device to be plugged into the socket.

SUMMARY OF THE INVENTION

A power supply detects whether a uni-plane or split-plane device is plugged into a common socket interface and provides the appropriate supply voltages. In a voltage regulator embodiment, two separate regulators receive a source input voltage and actively regulate two separate or dual outputs. After power is initially applied, a logical decision is made whether or not to switch to a uni-plane mode, where the second regulator is coupled to the same feedback signal and thus regulates at the same voltage as the first. This decision is made by reviewing the voltage difference between the two regulator outputs. If a uni-plane device is present, the two output voltages are effectively coupled together and thus essentially have the same voltage level regardless of any attempt to regulate them at different levels. Thus, if there is no substantial voltage difference between the two outputs, the circuit switches to uni-plane mode. However, if there is a certain voltage difference between the two outputs indicating a split-plane device is connected, the split-plane mode is maintained.

The voltage regulators include two separate amplifiers for comparing a reference voltage with two feedback voltages derived from the two regulator outputs, respectively. The two amplifiers control separate transistor circuits for regulating the two outputs to different voltage levels. A detection circuit monitors the output voltages and controls a switch circuit to determine the appropriate mode. In particular, uni-plane mode is selected if the voltages remain relatively equal, whereas split-plane mode is selected when the two output voltages are different by a predetermined amount. The switch circuit connects the feedback path from the second output to the second amplifier in split-plane mode, but otherwise connects the feedback path from the first output to the second amplifier in the uni-plane mode. The switch circuit preferably includes a couple of analog gates for switching the desired feedback path. A latch circuit provides enable signals to the analog gates so that only one gate is activated at any time to connect the desired feedback path.

A comparator is preferably used within the detection circuit to monitor both outputs during power-up to determine if uni-plane or split plane mode is needed. In one embodiment, mode determination is made after the outputs have achieved a regulating voltage level. A timing circuit initially sets the switch circuit according to the split-plane mode upon power-up and then enables a gate to receive a reset signal to toggle the switch circuit for uni-plane mode for a predetermined period after power-up. This time period is long enough for both outputs to reach a regulating level. The comparator compares the output voltage levels and asserts the reset signal if the difference between the output voltages is less than a certain amount. Otherwise, the reset signal is not asserted and split-plane mode is maintained.

In another regulator embodiment, a disable circuit momentarily disables the second regulator and compares the output voltage while the first output voltage is rising but before it reaches its regulating level. The switch circuit is set according to split-plane mode until the first output voltage reaches a certain voltage, substantially less than regulating level, while the second regulator is still disabled. A timing circuit is then initiated for a predetermined period to allow the switch circuit to be reset. A comparator identifies a dual-mode device if the magnitude of the second output voltage is less than a predetermined ratio of the first output voltage while the first output voltage is increasing, but otherwise identifies a uni-plane device and asserts the reset signal. Then, after the mode determination is made, the second regulator is enabled. In this latter embodiment, the operation mode is accomplished before the regulators reach full regulating output voltages, so that the appropriate mode is almost immediately established.

In an alternative embodiment, two separate voltage supplies are coupled to a detection and switch circuit for switching the supply voltages. A first power supply provides sole power to a uni-plane device or provides core power to a split-plane device. A second power supply provides power to the I/O region of a split-plane device or solely to remaining support circuitry if the device is uni-plane. A supervisory circuit is also provided which asserts a power good signal when a primary supply voltage achieves regulation, and asserts a reset signal for a short time period during power-up. As in the voltage regulator embodiments described above, split-plane mode is initially assumed so that the first power supply attempts to regulate at a different, lower voltage level compared to the second power supply. A detection circuit includes a comparator for monitoring the output voltage of the first power supply and provides a switch signal if it rises above a predetermined level indicating uni-plane. A switch circuit disconnects the second power supply from the device if the switch signal is asserted when the power good signal is asserted since the device is uni-plane and requires only a single voltage supply.

The first supply is preferably configurable to provide one of several desired voltages based on one or more configurations of the device, such as its operating frequency and its plane configuration. The plane configuration determines, for example, whether the device is a uni-plane or a split-plane device. In this manner, a plurality or matrix of operating voltage levels are defined, where the configurable power supply asserts a voltage at one of the voltage levels to achieve desired performance and/or efficiency requirements based on the detected configurations. A processor, for example, may operate at one of several different frequencies, such as 75, 90, 100, 120, 133, 150, 166, etc., megahertz (MHz), or at a multiple of these operating frequencies. An array of voltage levels are defined for the frequencies for one plane configuration, and another array is defined for another plane configuration, forming a matrix of possible operating voltage levels.

A frequency determination circuit is provided for detecting the desired operating speed of the processor. The frequency determination circuit preferably comprises a speed jumper block having a slot for each desired operating frequency. A device configuration circuit, such as a programmable array logic (PAL) device or the like, is also provided for detecting the operating frequency from the jumper block, for receiving a plane configuration signal indicating whether the device is uni-plane or split-plane, and for determining a corresponding operating voltage level. The device configuration circuit asserts configuration signals to the configurable power supply indicative of the device configuration for determining the corresponding operating voltage for the device. The plane configuration circuit may be provided from the device itself, or from the detection and switch system described previously.

The power supply receives the configuration signals and respondingly asserts the appropriate voltage level. The configurable power supply preferably includes a voltage divider receiving a first reference signal for providing a variable reference signal. Preferably, a voltage reference device, such as a Zener diode or the like, receives an independent power signal and provides the first reference signal. The variable reference signal is provided to a switching power supply controller, which asserts the operating voltage having a level corresponding to the variable reference signal. An array of switching devices is coupled to the voltage divider and receives the configuration signals and modifies the output voltage based on the received configuration signals. Preferably, the voltage divider is a resistive voltage divider, and the array of switched devices includes a plurality of resistors and switching transistors, such as field-effect transistors (FETs) or the like, for modifying the voltage division and thus the output voltage.

A method according to the present invention of detecting an operating configuration of a device and for asserting a corresponding operating voltage to the device, comprises the steps of detecting a frequency of operation, detecting a plane configuration of the device, and asserting an operating voltage to the device having a level corresponding to the operation frequency and the plane configuration. The step of detecting a plane configuration preferably comprises the steps of providing first and second operating voltages to a first and a second portion, respectively, of the device, and comparing a voltage of said first portion with a reference signal upon power up. The step of asserting an operating voltage to the device preferably comprises the steps of asserting the operating voltage at an initial low voltage level, such as 2.5 volts, and asserting the operating voltage at one of a matrix of voltage levels based on the operation frequency and the plane configuration.

It is therefore appreciated that a power supply according to the present invention detects a processor's specifications and provides the appropriate supply voltage(s).

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
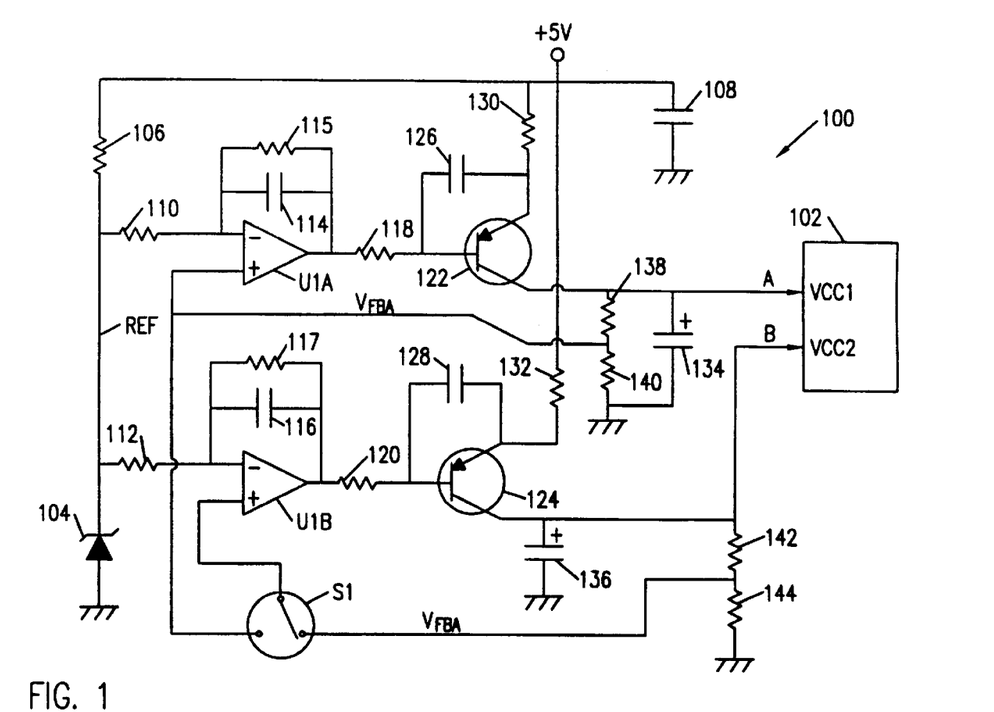
FIG. 1 is a schematic diagram of a split-plane regulator including manual switching means.

Referring now to FIG. 1, a schematic diagram is shown of a voltage regulator 100 including a manual switch S1 for switching between uni-plane and split-plane modes. A 5 volt (V) DC source, referred to as the +5V signal, is filtered through a capacitor 108 to ground and is connected through a resistor 106 to the cathode of a Zener diode 104 for developing a reference voltage referred to as REF, where the anode of the Zener diode 104 is connected to ground. The Zener diode 104 is preferably the LT1009 by Linear Technologies, Inc. for developing a reference voltage of 2.5V. The REF signal is provided through resistors 110 and 112 to the inverting inputs, respectively, of two amplifiers U1A and U1B. Capacitors 114, 116 and resistors 115, 117 are connected between the inverting inputs and the outputs of the amplifiers U1A and U1B, respectively, where the outputs are further fed through resistors 118, 120, respectively, to the base terminals of two transistors 122, 124, respectively.

The transistors 122, 124 are preferably pnp bipolar transistors, such as the TIP 125, although other linear switching devices will suffice. Both transistors 122, 124 have filter capacitors 126, 128 coupled between their emitters and base terminals, respectively, and also have resistors 130, 132 coupled between the +5V signal and their respective emitters for sourcing current through the transistors 122, 124. The collector of transistor 122 provides the output voltage A, which is filtered through a capacitor 134 for developing a voltage level of approximately 3.525V. The collector of the transistor 124 develops an output voltage referred to as B, which is preferably 3.300V in the preferred embodiment, which is filtered by another capacitor 136 to ground. The A and B outputs are shown provided to the VCC1 and VCC2 inputs, respectively, of a split-plane device 102. However, a uni-plane device includes only a single VCC input, which is connected to both the A and B outputs. Thus, the A and B outputs have essentially the same output voltage if connected to a uni-plane device.

The A output is sampled through a resistive voltage divider comprising resistors 138 and 140 coupled in series between the A output and ground, having a junction providing a feedback signal $V_{FBA}$ to the non-inverting input of the amplifier U1A. In a similar manner, the B output is sampled through a resistive voltage divider comprising resistors 142 and 144 coupled in series between the B output and ground, having a junction providing a signal $V_{FBB}$. A single pole, double throw switch S1 has its common terminal connected to the non-inverting input of the amplifier U1B, which has its other terminals coupled to the $V_{FBA}$ and $V_{FBB}$ signals, respectively.

The switch S1 is a manual switch for selecting between the $V_{FBA}$ and $V_{FBB}$ feedback signals and providing the selected signal to the non-inverting input of the amplifier U1B. In particular, the $V_{FBB}$ feedback signal is selected according to split-plane mode where the regulator 100 regulates separate voltages on the A and B outputs as described above. It is noted, however, that if a uni-plane device is present, both A and B outputs are coupled together and have the same voltage level in spite of separate regulation. If switch S1 selects the $V_{FBA}$ signal according to uni-plane mode, then both the A and B outputs are regulated at the voltage level, which is preferably the same voltage as the A output of 3.525V. In this manner, the regulator 100 is manually switched between the uni-plane and split-plane modes. The voltage regulator 100 is not very practical since it requires manual switching to select between the desired modes.

Figure 2:
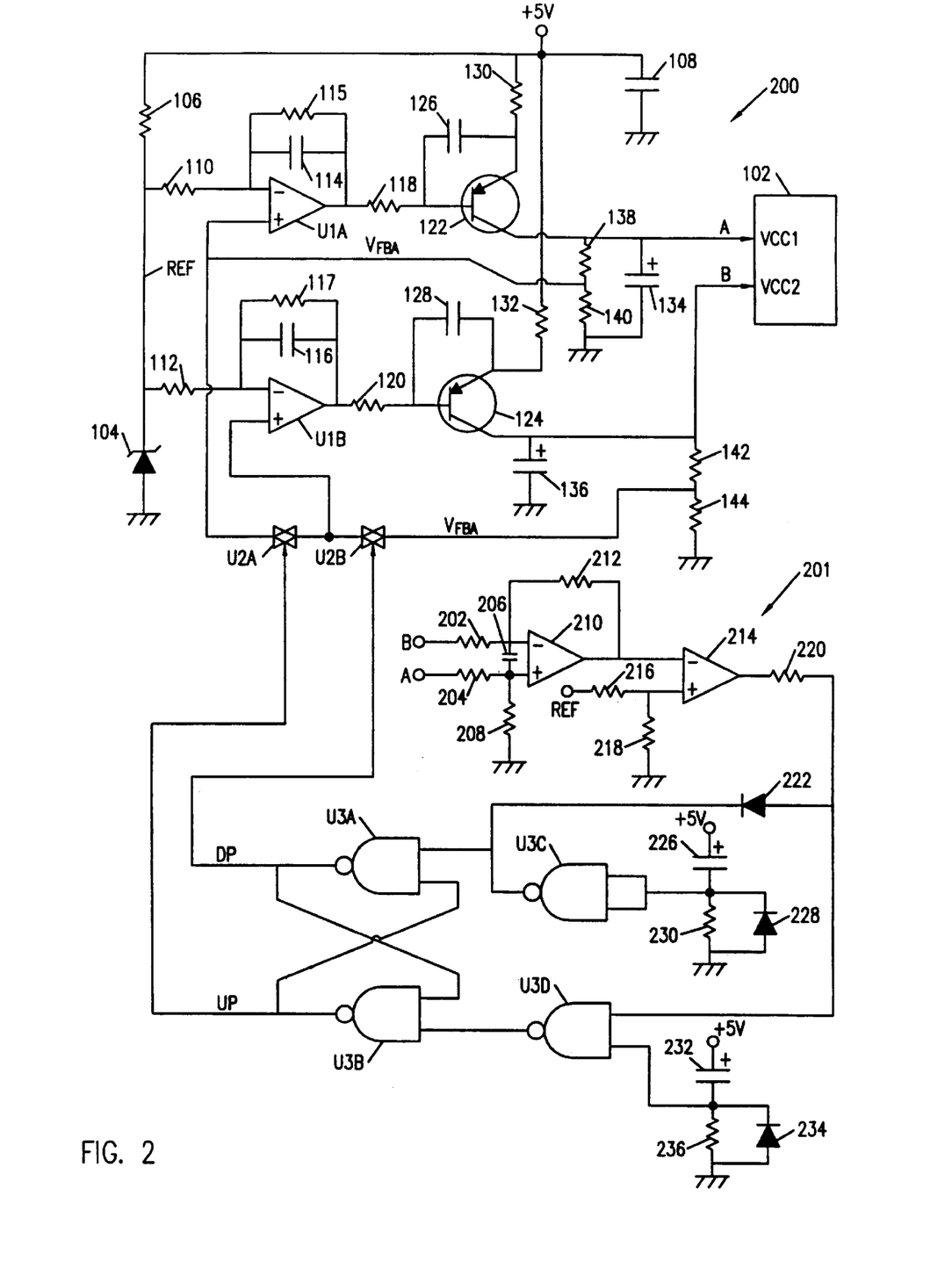
FIG. 2 is a voltage regulator using automatic detection and switching means.

Referring now to FIG. 2, a schematic diagram of a voltage regulator 200 is shown including an automatic detection circuit 201 for switching between uni-plane and split-plane modes. The primary portion of the voltage regulator 200 is similar to the voltage regulator 100 where similar components have identical reference numerals. Thus, the Zener diode 106, the amplifiers U1A, U1B, the transistors 122, 124 and supporting components are used to regulate the A and B outputs as described above. In this embodiment, however, the manual switch S1 is replaced by two separate analog gates, U2A and U2B. In particular, the $V_{FBA}$ signal is provided to the input of analog gate U2A, having its output provided to the non-inverting input of the amplifier U1B. In a similar manner, the $V_{FBB}$ signal is provided to the input of the analog gate U2B, having its output connected to the non-inverting input of the amplifier U1B. Only one of the analog gates, U2A, U2B is on at any given time as described below, where the analog gate U2B selects split-plane mode and the analog gate U2A selects uni-plane mode.

In the detection circuit 201, the B output is provided through a resistor 202 to one side of the capacitor 206 and to the inverting input of an amplifier 210. The A output is provided through a resistor 204 to the other side of the capacitor 206, to one end of a resistor 208 and to the non-inverting input of the amplifier 210. The other end of the resistor 208 is connected to ground and a feedback resistor 212 is coupled between the inverting input and the output of the amplifier 210. Generally, the amplifier 210 serves as a buffer which asserts a voltage at its output equivalent to the voltage differential between the A and B outputs.

The output of the amplifier 210 is provided to the inverting input of another amplifier 214. A voltage divider comprising resistors 216 and 218 coupled in series between the REF signal and ground has a junction connected to the non-inverting input of the amplifier 214. The amplifier 214 serves as a comparator for comparing the differential voltage of the A, B outputs with the voltage established by the resistive voltage divider of the resistors 216, 218. The resistors 216, 218 are chosen so that the REF signal is divided to a predetermined voltage level less than the expected A/B differential of 3.525–3.3=0.225V. This voltage is preferably chosen at approximately 0.15 mV. Thus, if the A and B outputs are different by more than 0.15V, then the amplifier 214 asserts its output low, but otherwise asserts it output high.

The output of amplifier 214 is provided to one end of a resistor 220, having its other end connected to the anode of a diode 222 and to one input of a two-input NAND gate U3D. The cathode of the diode 222 is provided to one input of another two-input NAND gate U3A, which is cross-coupled with another two-input NAND gate U3B implementing an set-reset (S-R) latch. The output of the NAND gate U3A, referred to as DP (split-plane), is provided to one input of the NAND gate U3B, having its output, referred to as UP (uni-plane) connected to the other input of the NAND gate U3A to implement the S-R latch. The output of another NAND gate U3C is also connected to the cathode of the diode 222. The +5V signal is provided to one end of a capacitor 226, having its other end connected to both inputs of the NAND gate U3C, to one end of a resistor 230 and to the cathode of a diode 228. The other end of the resistor 230 and the anode of the diode 228 are both connected to ground. The +5V signal is also provided to one end of a capacitor 232, having its other end connected to the other input of the NAND gate U3D, to one end of a resistor 236 and to the cathode of a diode 234. The other end of the resistor 236 and the anode of diode 234 are both connected to ground. The output of the NAND gate U3D is provided to the other input of the NAND gate U3B. Finally, the output of the NAND gate U3A is connected to the control terminal of the analog gate U2B, while the output of the NAND gate U3B is connected to the control terminal of the analog gate U2A. The NAND gates U3A–U3D are all preferably the 74HC132-type gates, which exhibit correct operation at relatively low source voltage levels, such as 1V.

The operation of the voltage regulator 200 is now described. Upon power-up, +5V signal is the primary power source and thus begins rising relatively quickly and pulls both inputs of the NAND gate U3C high through the capacitor 226. The +5V signal also pulls one input of the NAND gate U3D high through the capacitor 232. The NAND gate U3C acts as an inverter and asserts its output low, which causes the NAND gate U3A to initially assert its output high to select the analog gate U2B. The NAND gate U3C also pulls the other input of the NAND gate U3D low through the diode 222, so that the output of the NAND gate U3D is asserted high. The NAND gate U3B initially asserts its output low since both its inputs are high. In this manner, the analog gate U2B is initially activated while the analog gate U2A is turned off, so that split-plane mode is initially selected upon power-up.

If the device 102 is a split-plane device, then the A output begins regulating at 3.525V while the B output begins regulating at 3.3V as desired. The amplifier 210 asserts its output higher than the voltage at the non-inverting input of the amplifier 214, so the amplifier 214 asserts its output low. However, if the device 102 is a uni-plane device, then the voltage of the A and B outputs are equal and the amplifier 214 asserts its output high.

The resistor 230 is chosen smaller than the resistor 236, so that the capacitor 226 charges faster than the capacitor 232 since these capacitors have roughly equal capacitance. The RC time constant of the resistor 230 and the capacitor 226 is chosen long enough to keep one input of both NAND gates U3A and U3D low during power-up to initially set the latch U3A, U3B according to split-plane mode. The RC time constant of the resistor 236 and the capacitor 232 is chosen longer and sufficient to allow the A and B outputs to reach a regulating level. As an example, the capacitors could be 2.2 μF capacitors, where the resistor 230 is 270 KΩ and the resistor is 470 KΩ. Thus, the capacitor 226 charges pulling the inputs of the NAND gate U3C low, which asserts its output high. This releases the diode 222, so that the amplifier 214 now drives the other input of the NAND gate U3D. If the device 102 is a split-plane device so that the amplifier 214 asserts its output low, the state of the NAND gate U3D and the S-R latch U3A, U3B does not change, so that the split-plane mode is maintained. The capacitor 232 then charges to pull one input of the NAND gate U3D low, so its keeps its output high during the remainder of operation.

However, if the device 102 is a uni-plane device so that both inputs to the NAND gate U3D are momentarily pulled high, the NAND gate U3D asserts its output low to "reset" the S-R latch U3A, U3B, where the NAND gate U3B activates the analog gate U2A and the NAND gate U3A turns off the analog gate U2B. In response, the amplifier U1B controls the transistor 124 to regulate its output to 3.525V, which is the same as the A output voltage. The capacitor 232 then charges so that the NAND gate U3D asserts its output high. Uni-plane mode is selected for the remainder of operation.

In this manner, the detection circuit 201 initially selects split-plane mode by selecting the analog gate U2B. After the output voltages begin regulating, they are compared through amplifiers 210, 214 to determine if a uni-plane device is connected. The RC timing parameters of the resistor 230 and capacitor 226 and the resistor 236 and capacitor 232 provides a window of time in which to switch to the uni-plane mode. Although this method is acceptable and achieves the desired result, it may further be desired to detect whether a uni-plane or split-plane device is connected before final voltage regulation is reached. The voltage regulator 200 with the detection circuit 201 has a further limitation of requiring that the A output voltage be greater than the B output voltage in split-plane mode. It may be desired to have the A output voltage be less than the B output voltage.

Figure 2A:
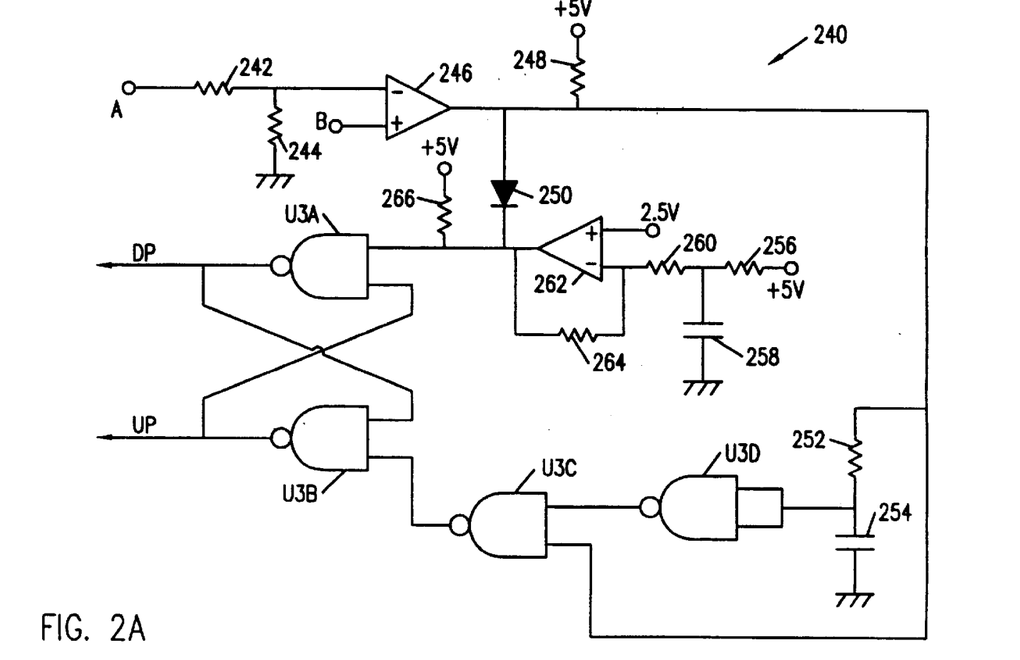
FIG. 2A is another embodiment of the mode sensing circuitry of FIG. 2 for determining switching between uni-plane and split-plane modes.

Referring now to FIG. 2A, another detection circuit 240 is shown which is similar to the detection circuit 201. The A output voltage is provided across a voltage divider comprising resistors 242 and 244 coupled in series between the A output and ground. The resistors 242, 244 have a junction connected to the inverting input of a comparator 246. The non-inverting input of the comparator 246 is connected to the B output, and the output of comparator 246 is coupled to one end of a pull-up resistor 248 and to the anode of a diode 250. Also, the output of comparator 246 is connected to one end of a resistor 252 and to one input of the NAND gate U3C. The other end of the resistor 252 is connected to both inputs of the NAND gate U3D and to one end of a capacitor 254, having its other end connected to ground. The output of the NAND gate U3D is connected to the other input of the NAND gate U3C.

The +5V signal is provided to one end of a resistor 256, having its other end connected to one end of a capacitor 258 and to one end of a resistor 260. The other end of the capacitor 258 is connected to ground and the other end of the resistor 260 is provided to the non-inverting input of a comparator 262 and to one end of a feedback resistor 264. The inverting input of the comparator 262 receives a reference voltage signal of 2.5V. The output of comparator 262 is connected to the other end of the resistor 264, to the cathode of diode 250, to one end of a pull-up resistor 266 and to one input of the NAND gate U3A. The other end of the resistor 266 is connected to the +5V signal. The output of the NAND gate U3A is connected to one input of the NAND gate U3B, having its output connected to the other input of the NAND gate U3A in a similar manner as described previously for implementing an S-R latch. Again, the output DP of the NAND gate U3A is connected to the control terminal of the analog gate U2B and the output UP of the NAND gate U3B is connected to the control terminal of the analog gate U2A.

The operation of the detection circuit 240 is now described. The comparator 262 initially asserts its output low during power-up, which causes both the NAND gate U3A and U3C to assert their outputs high. The A and B outputs begin regulating, and the comparator 246 asserts its output high if a uni-plane device is connected, but otherwise asserts its output low. Meanwhile, the capacitor 258 charges and the comparator 262 asserts its output high releasing the diode 250. If the device 102 is a split-plane device, the comparator 246 keeps one input of the NAND gate U3C low so that split-plane mode is maintained. However, if a uni-plane device is connected, the comparator 246 asserts its output high, which begins charging the capacitor 254. Both inputs to the NAND gate U3C are momentarily asserted high, which resets the S-R latch U3A, U3B to select the analog gate U2A according to the uni-plane mode. The capacitor 254 finally charges so that NAND gate U3D asserts its output low, so NAND gate U3C keeps its output high for the remainder of operation. Thus, operation is similar to the detection circuit 201 in that the mode decision is made after the A and B outputs have reached a regulating voltage. Also, it is required that the A output voltage be greater than the B output voltage in split-plane mode.

Figure 3:
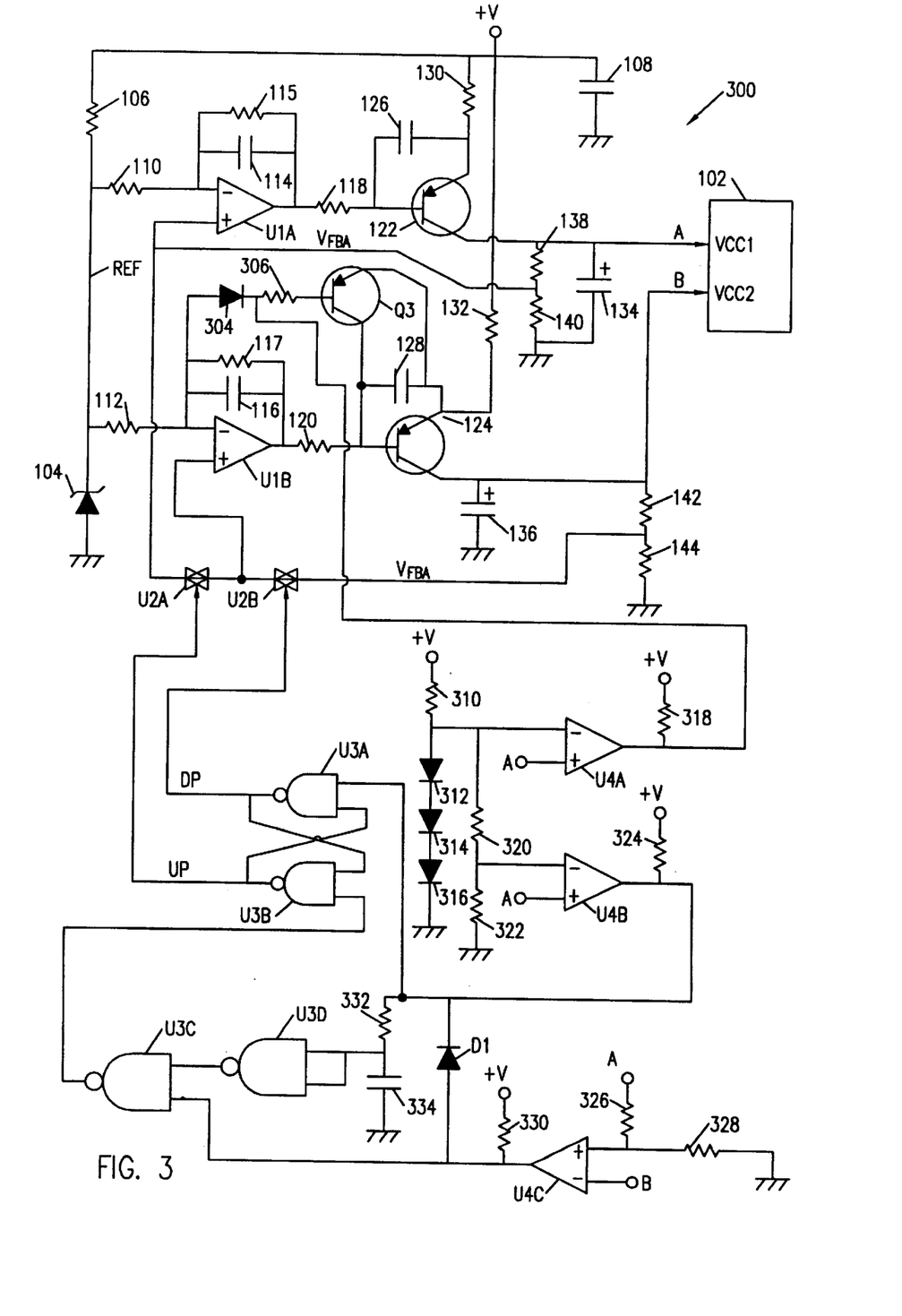
FIG. 3 is another regulator embodiment of a voltage regulator using automatic mode detection and switching.

Referring now to FIG. 3, a schematic diagram is shown of a voltage regulator 300 including a detection circuit 302. The primary regulating portions of the voltage regulator 300 are similar to that of the voltage regulators 100 and 200, so that similar components assume identical reference numerals. However, in this embodiment, some of the resistor and capacitor values may be slightly modified for maximum operation where such variances are considered merely design choices and not intended for limiting the present invention. Also, since the primary input voltage may have any voltage desired, it is referred to simply as the +V signal. Further, the Zener diode 104 may be modified to select any desired reference voltage level below the +V signal. The A and B output voltages are developed in a relatively similar manner using the Zener diode 104, the amplifiers U1A, U1B, the transistors Q1 and Q2 and supporting components. However, the inverting input of the amplifier U1B is further connected to the anode of a diode 304, having its cathode connected to one end of a resistor 306. The diode 304 is optional and not necessary for desired functionality, where the resistor 306 could otherwise be connected directly to the inverting input of the amplifier U1B. The other end of the resistor 306 is provided to the base terminal of a transistor Q3, having its emitter connected to the emitter of the transistor Q2. The collector of transistor Q3 is also connected to the base of the transistor Q2.

In the detection circuit 302, the +V signal is connected to one end of a resistor 310, having its other end connected to the anode of a diode 312 and to the inverting input of a comparator U4A. Three diodes 312, 314, 316 are connected in series between the resistor 310 and ground for developing a reference voltage of approximately 1.5V to the comparator U4A. The non-inverting input of a comparator U4A receives the A output. The output of the comparator U4A is connected to the cathode of the diode 304 and to one end of a pull-up resistor 318, having its other end connected to the +V signal.

The inverting input of the comparator U4A is also connected through a resistive voltage divider comprising series resistors 320 and 322 to ground, having a junction connected to the inverting input of a comparator U4B. The resistors 320, 322 further divide the 1.5V reference signal to approximately 1.25V. The non-inverting input of comparator U4B is connected to the A output, and the output of comparator U4B is connected through pull-up resistor 324 to the +V signal. The output of comparator U4B is also connected to one input of the NAND gate U3A, which is cross-coupled with the NAND gate U3B in a similar manner as described previously.

The B output is connected to the non-inverting input of a comparator U4C, having its inverting input connected to the junction of a resistive voltage divider comprising two resistors 326 and 328 coupled in series between the A output and ground. The output of comparator U4C is connected through pull-up resistor 330 to the +V signal, to the anode of a diode D1 and to one input of the NAND gate U3C. The output of NAND gate U3C is connected to one input of the NAND gate U3B and the cathode of diode D1 is connected to the output of the comparator U4B. The output of comparator U4B is also connected to one end of a resistor 332, having its other end connected to both inputs of the NAND gate U3D and to one end of a capacitor 334, having its other end connected to ground. The output of the NAND gate U3D is connected to the other input of the NAND gate U3C. Again, the output DP of the NAND gate U3A is connected to the control terminal of the analog gate U2B and the output UP of the NAND gate U3B is connected to the control terminal of the analog gate U2A.

Figure 4:
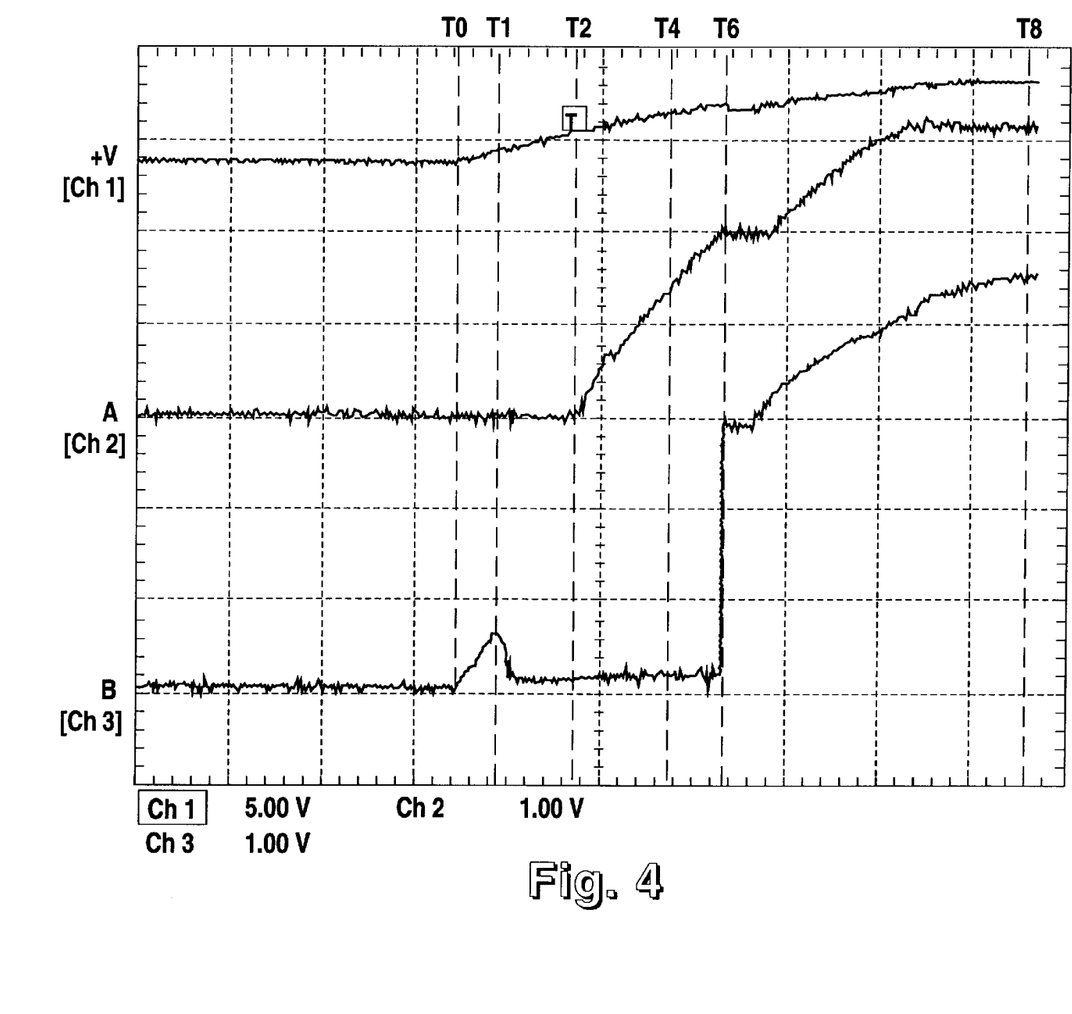
FIG. 4 is a timing diagram illustrating operation of the voltage regulator of FIG. 3.

Operation of the voltage regulator 300 including the detection circuit 302 will now be described with reference to the timing diagram of FIG. 4. The voltage signal +V, A and B are plotted versus time from power-up at a time T0. The +V is plotted with a different scale than the A and B outputs. Upon power-up at time T0, the +V signal rises relatively quickly and establishes a 1.5V reference signal at the inverting input of the comparator U4A through the three diodes 312, 314 and 316. The A signal does not begin to rise until a subsequent time T2. The comparator U4A initially asserts its output low, turning on the transistor Q3, which in turn keeps the transistor Q2 off. Thus, the B output voltage is initially not regulated after power is applied, although the B output will rise with the A output if a uni-plane device is connected. If a split-plane device is connected, the B output may float slightly above 0 volts, but will tend to be pulled low through the resistors 142, 144. FIG. 4 illustrates the case where the device 102 is a split-plane device so that B output stays low. The glitch of the B output voltage at time T1 occurs because of a momentary indeterminate state of the NAND gates U3A-D. However, this glitch is negligible and disappears quickly after the +V signal reaches about 1V.

The comparator U4B initially asserts its output low which causes the NAND gate U3A to assert its output high to initially select the analog gate U2B according to the split-plane mode. The comparator U4B also pulls one input of the NAND gate U3C low through the diode D1, so that the NAND gate U3B initially asserts its output low. Thus, the split-plane mode is initially selected. The voltage divider comprising the resistors 320 and 322 provides a reference voltage of approximately 1.25V to the inverting input of the comparator U4B, which asserts its output high when the A output voltage rises above 1.25V, which occurs at a time T4.

At this point in time, the comparator U4C selects uni-plane or split-plane mode based on the voltage ratio of the A and B outputs. If device 102 is a split plane device, the B output voltage is still low when the comparator U4B asserts its output high at time T4, so that the comparator U4C maintains its output low. This comparison is based on the ratio of the resistors 326, 328, which resistors are preferably equal. Thus, if the B output is less than 50% of the A output voltage, one input of the NAND gate U3C is kept low, so that the S-R latch U3A, U3B maintains its initial state and split-plane mode is maintained.

However, if the A and B outputs are rising together due to a uni-plane device 102 connected to the voltage regulator 300, then the comparator U4C asserts its output high before or by the time the comparator U4B asserts its output high. The capacitor 334 initially pulls both inputs of the NAND gate U3D low, so that the NAND gate U3D initially asserts its output high. When the comparator U4B asserts its output high, the capacitor 334 begins charging through the resistor 332. Since the output of the NAND gate U3D remains high until the capacitor 334 is charged, both inputs to the NAND gate U3C are momentarily asserted high so that the NAND gate U3C asserts its output low, thereby resetting the S-R latch U3A, U3B. In this manner, uni-plane mode is selected where the NAND gate U3B activates the analog gate U2A, whereas the NAND gate U3A turns off the analog gate U2B according to the uni-plane mode. In this manner, either uni-plane or split-plane mode is selected prior to either of the A or B outputs achieving regulation.

Eventually, the A output voltage reaches 1.5V at time T6 activating the comparator U4A, which turns off the transistor Q3, thereby turning on transistor Q2, so that the B output voltage is allowed to be regulated by the amplifier U1B. Thus, at about time T6, the B output voltage immediately rises until controlled by the amplifier U1B. Of course, the B output voltage is regulated to 3.3V in split-plane mode if the analog gate U2B is selected, or is regulated at 3.525V in uni-plane mode if the analog gate U2A is selected. The A and B achieve regulation at a subsequent time T8, as shown.

The voltage regulator 300 with the detection circuit 302 has several advantages over the voltage regulators 100, 200 described previously. The detection circuit 302 makes the logical determination as to which kind of device is detected and chooses the appropriate mode while one or both output voltages are rising, but before it (they) reach(es) operational regulation. Furthermore, detection circuit 302 does not require that the A output voltage be greater than the B output voltage in the split-plane mode, since it makes the appropriate decision regardless of the ultimate regulated voltage levels. This is true since the regulation of the B output voltage is disabled during initial power-up facilitating mode detection. Thus, the voltage regulator 300 with detection circuit 302 provides superior performance and greater design flexibility for providing voltage regulation to either uni-plane or split-plane devices.

Figure 5:
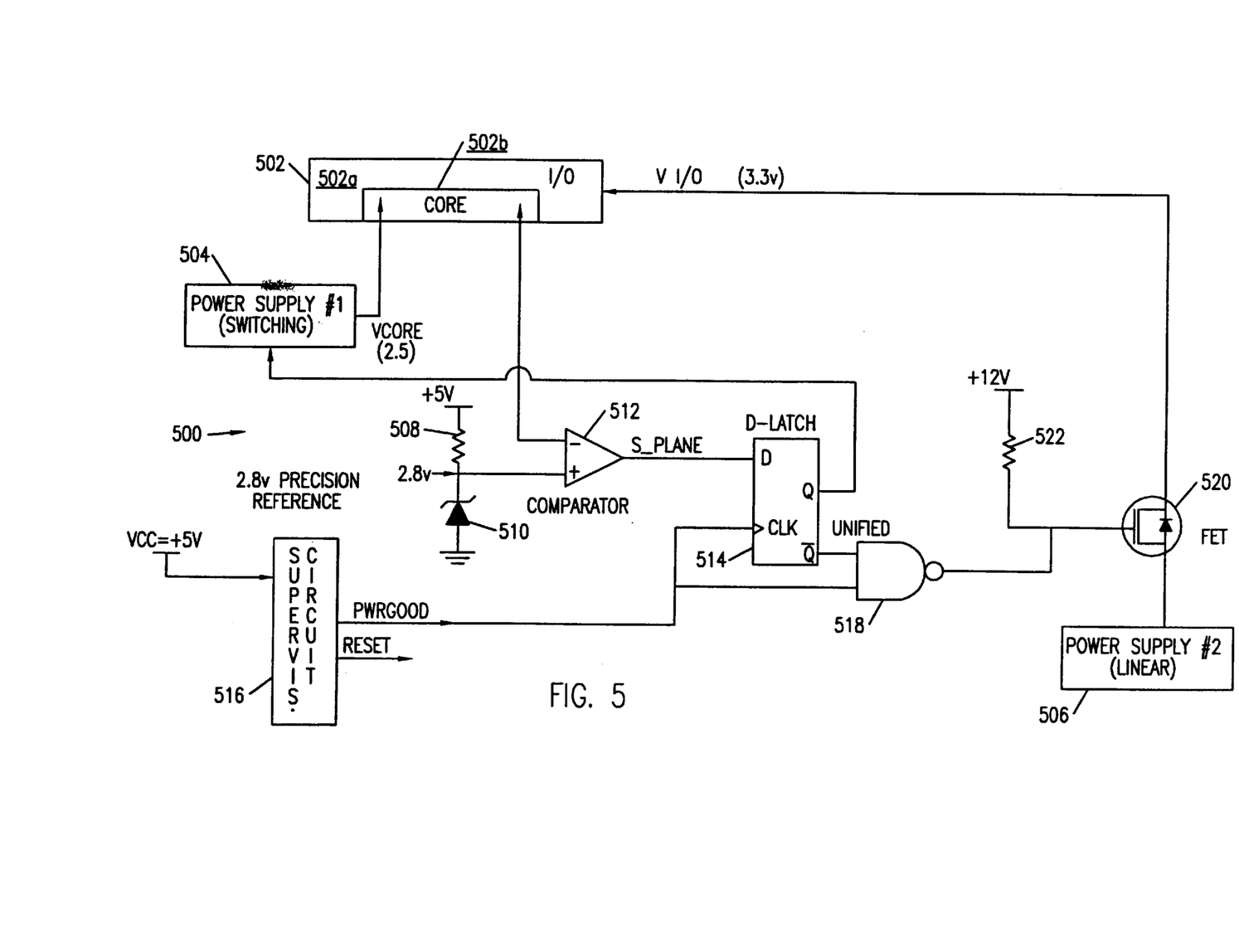
FIG. 5 is a dual power supply embodiment.

Referring now to FIG. 5, a schematic diagram is shown of a dual power supply circuit 500 according to an alternative embodiment. A device 502 is either a split-plane device requiring separate supply voltages to an I/O section 502a and a core section 502b or a uni-plane device where the I/O and core sections 502a, 502b are internally connected together. The device 502 could be a processor, such as either the P54 or P55 family of Pentium microprocessors or the P6 microprocessor by Intel, although the present invention is not limited by the particular type of device 502. A first power supply 504 provides a supply voltage, referred to as VCORE, directly to the core section 502b and a second power supply 506 supplies power through a transistor device 520 to the I/O section 502a. The power supply 504 is preferably a switching type supply initially providing an output voltage of 2.5V, whereas the power supply 506 is preferably a linear-type supply providing an output voltage of approximately 3.3V. The primary supply voltage is preferably five volts and is referred to by a signal +5V. The +5V signal is provided to one end of a resistor 508, having its other end connected to the cathode of a Zener diode 510, having its anode connected to ground. The Zener diode 510 is preferably a 2.8 volt precision reference device. The cathode of the diode 510 is provided to the non-inverting input of a comparator 512, having its inverting input for monitoring the supply voltage developed on the core section 502b. It is noted that the voltage developed on the core section 502b is not necessarily the same as the output of the power supply 504.

The output of the comparator 512 is connected to the D input of a D-type latch 514, which receives a signal PWR-GOOD at its clock input from a supervisory circuit 516. The supervisory circuit 516 is preferably the MAX708 which monitors the +5V signal and asserts the PWRGOOD signal once the +5V signal achieves a voltage of 4.6V after power-up. The supervisory circuit 516 also asserts a RESET* signal upon power-up to keep the electronic device (not shown) in a reset condition until regulated power is available. An asterisk (*) at the end of a signal name denotes negative logic where the signal is considered asserted when low and unasserted when high. Approximately 200 ms after the PWRGOOD signal is asserted, the supervisory circuit 516 de-asserts the RESET* signal to allow the electronic device to initiate normal operation.

The inverted Q output of the latch 514 is provided to one input of a two-input NAND gate 518, which receives the PWRGOOD signal at its other input. The output of NAND gate 518 is provided to the gate of the transistor 520, which is preferably a field-effect transistor (FET) 520, and also to one end of a resistor 522 receiving another primary supply voltage having a voltage level of approximately 12V, referred to as the +12V signal. The FET 520 is more preferably an N-channel enhancement metal-oxide-semiconductor FET (MOSFET) or the like. The source of the FET 520 receives the output of the power supply 506 and its drain is connected to the I/O section 502a of the device 502 through a signal VI/O. The Q output of the latch 514 asserts a signal S_PLANE and the inverted Q output asserts a signal U_PLANE, indicating that the device 502 is either a split-plane or a uni-plane device, respectively.

Figure 6:
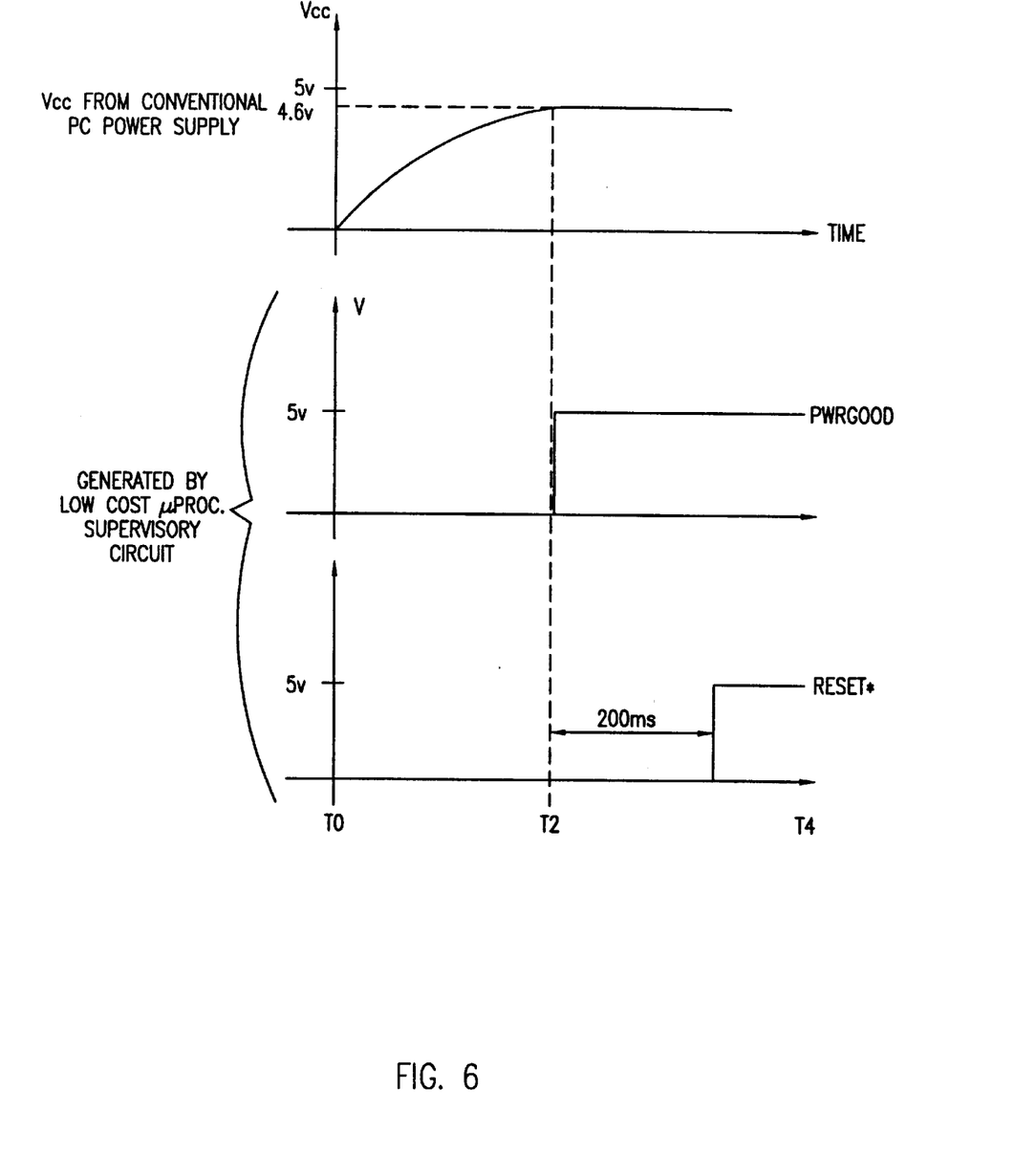
FIG. 6 is a timing diagram illustrating operation of the embodiment of FIG. 5.

Operation of the dual power supply circuit 500 is now described with reference to FIG. 6, which is a timing diagram illustrating operation of the dual power supply circuit 500. Upon power-up at time T0, the +5V signal begins to rise until eventually regulated at approximately 5V. The RESET* signal is asserted during power-up. The PWRGOOD signal is initially de-asserted low, so that the FET 520 is activated, and so that the power supplies 504, 506 attempt to provide separate power signals to the device 502. If the device 502 is a split-plane device, the core section 502b rises to 2.5V and the I/O section 502a rises to 3.3V. However, if the device 502 is a uni-plane device, both the I/O and core sections 502a, 502b are pulled to the higher voltage level of 3.3V.

As the +5V signal is rising, the power supply 504 and power supply 506 begin regulating at their respective voltages. The comparator 512 initially asserts its output high and keeps its output high if the core section 502b remains below 2.8V, indicating a split-plane device. However, the comparator 512 asserts its output low if the device 502 is a uni-plane device, where the core section 502b is pulled to the higher voltage level of 3.3V. When the +5V signal rises to approximately 4.6V at time T2, the supervisory circuit 516 asserts the PWRGOOD signal which clocks the latch 514. If the device 502 is a split-plane device, the inverted Q output is pulled low, thereby keeping the output of the NAND gate 518 high and FET 520 remains on, so that the power supply 506 continues to provide separate voltage to the I/O section 502a. However, if the device 502 is a uni-plane device, the output of the comparator 512 is asserted low and the inverted Q output is asserted high while the PWRGOOD signal is asserted high, so that NAND gate 518 asserts its output low turning off the FET 520. In this manner, the power supply 506 is disconnected from providing power to the device 502. In this case, the power supply 504 provides sole operating voltage to the device 502. Approximately 200 ms later at time T4, the RESET* signal is de-asserted. In this manner, the mode decision is made almost immediately after the PWRGOOD signal is asserted at time T2, long before the electronic device is pulled out of reset upon power-up.

The power supply 504 is a programmable supply in the preferred embodiment and can provide any one of several different operating voltages as desired. In one embodiment, the Q output of the latch 514 provides the S_PLANE signal to the power supply 504, causing the power supply 504 to assert a different voltage level if the device 502 is a uni-plane device. For example, if the device 502 is a uni-plane device, and the voltage of the core section 502b is forced to the higher voltage level, the power supply 504 attempts to pull its output low to regulate at the lower voltage level. However, the power supply 504 also detects the S_PLANE signal being negated low and reprograms its output to 3.3V for providing the higher voltage level to the device 502 if uni-plane mode is desired.

Figure 7:
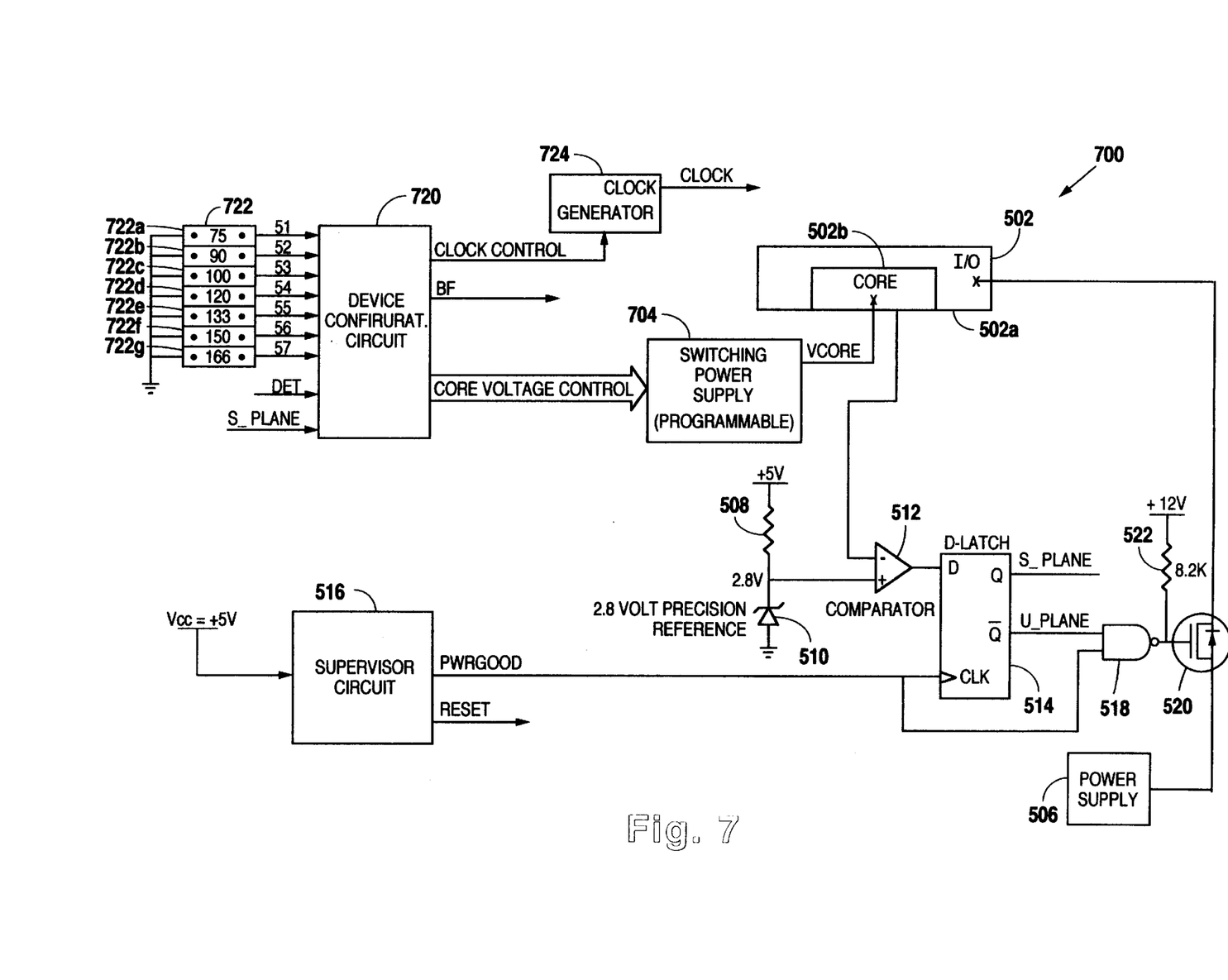
FIG. 7 is another dual power supply according to an alternative embodiment.

Referring now to FIG. 7, a schematic diagram is shown of a dual power supply circuit 700 according to another alternative embodiment of the present invention. The dual power supply circuit 700 is similar to the dual power supply circuit 500, where similar components assume identical reference numerals. The power supply 504 is replaced with a programmable switching power supply 704, which provides any one of a matrix of predetermined different operating voltages for the device 502 as desired. The power supply 704 receives one or more core voltage control signals from a device configuration circuit 720, where the core voltage control signals are used by the power supply 704 to determine the particular voltage supplied to the core 502b of the device 502. The device configuration circuit 720 is coupled to a speed jumper block 722, which provides a plurality of signals S1, S2, S3, S4, S5, S6 and S7 for determining the clock frequency of the electronic device and the device 502.

The speed jumper block 722 preferably includes a plurality of jumper slots 722a, 722b, 722c, 722d, 722e, 722f and 722g corresponding to the signals S1–S7, respectively, where each of the slots 722a–g have two terminals for receiving a conductive jumper for connecting the two terminals together, where one terminal provides a respective one of the signals S1–S7, and the other terminal is coupled to ground. Further, the jumper slots 722a–g and the signals S1–S7 preferably correspond to clock frequencies of 75, 90, 100, 120, 133, 150 and 166 megahertz (MHz), respectively, of the device 502. It is noted that more or less slots could be included and that the particular frequencies are a matter of design choice. Preferably, a jumper is plugged into one of the slots 722a–g corresponding to the desired frequency of operation of the electronic device and the device 502, where the corresponding one of the signals S1–S7 is grounded by the jumper. The remaining signals remain open-circuited or floating. The device configuration circuit 720 detects one of the signals S1–S7 being grounded and asserts a CLOCK CONTROL signal to a programmable frequency synthesizer implemented as a clock generator circuit 724, which asserts a signal CLOCK having the desired frequency. For example, if a jumper is plugged into the slot 722a, the signal S1 is grounded indicating a frequency of 75 MHz, and the clock generator circuit 724 asserts the CLOCK signal at a frequency of 75 MHz. The clock generator circuit 724 could be any type of clock circuitry, such as a CH9007 CPU clock generator circuit.

The device configuration circuit 720 also preferably asserts a signal BF indicating a multiple value of the corresponding frequency of operation for determining the frequency of a bus associated with the device 502. If the frequency of operation of the electronic device is 100 MHz indicated by the S1 signal being grounded, and if the BF signal indicates a multiple of one-half (½), then the bus operates at half the frequency of the device 502, or approximately 50 MHz. For example, if the electronic device is a computer system and the device 502 is a processor, the processor bus of the computer system may operate at 50 MHz while the processor operates at 100 MHz. The multiple could be, for example, 0.5, 0.25, etc., or any other desired multiple of the frequency.

The device configuration circuit 720 also receives the S_PLANE signal from the latch 514 for determining whether the device 502 is a uni-plane or a split plane device. The device configuration circuit 720 alternatively receives an optional signal DET from the device 502, which indicates whether the device 502 is split or uni-plane. In this case, the device 502 itself includes an optional DET pin for asserting the DET signal indicative of uni-plane or split-plane. For example, the DET signal could be asserted low indicating a split-plane device or high indicating a uni-plane device. However, if the device 502 does not include the DET pin, the DET signal is left open-circuited and the S_PLANE signal is used. Thus, the device configuration circuit 720 monitors either of the DET and S_PLANE signals for determining whether the device 502 is a split-plane or a uni-plane device. The device configuration circuit 720 also monitors the S1–S7 signals and determines the desired frequency of operation and asserts the core voltage control signals to the power supply 704 for controlling the voltage level of the VCORE signal. Preferably, a matrix of voltage levels is predetermined, where each voltage level in the matrix depends upon the type of device 502, as indicated by either of the DET or S_PLANE signals, and the speed (frequency) of operation as indicated by the S1–S7 signals. The device configuration circuit 720 may be implemented in any desired manner, such as programmable array logic (PAL) or the like.

The dual power supply circuit 700 operates in a similar manner as the dual power supply circuit 500. The FET 520 remains on if the device 502 is a split-plane device, where the power supply 506 provides separate power to the I/O section 502a. Also, the FET 520 is turned off if the device 502 is a uni-plane device, where the power supply 704 provides sole power to the device 502. The power supply 704 asserts an initial voltage level on the VCORE signal, where this initial voltage level is preferably a relatively low level, such as 2.5 volts. The power supply 704 modifies the VCORE signal based on the core voltage control signals received from the device configuration circuit 720. The device configuration circuit 720 determines the type and operating frequency of the device 502, and then asserts the core voltage control signals as desired to modify the voltage level of the VCORE signal, if necessary.

Operation could be the same as the dual power supply circuit 500, where the power supply 704 asserts an initial minimum voltage of 2.5 volts, and then raises its voltage to 3.3 volts if the device 502 is a uni-plane device, regardless of the frequency of operation. However, the device configuration circuit 720 and the speed jumper block 722 enable further refinement of the voltage level provided to the device 502 if desired. In the embodiment shown, a matrix of fourteen (14) different voltage levels are provided to the device 502 based on whether it is a split-plane or uni-plane device, and further based on its frequency of operation. For example, it may be desired to operate the device 502 at slightly lower voltage levels if it is operating at higher frequencies, such as 150 or 166 MHz, in order to reduce the amount of heat produced. Of course, more or less jumpers could be used to increase or decrease the number of possible voltage levels based on a greater or lesser number of possible frequencies, respectively.

Figure 8:
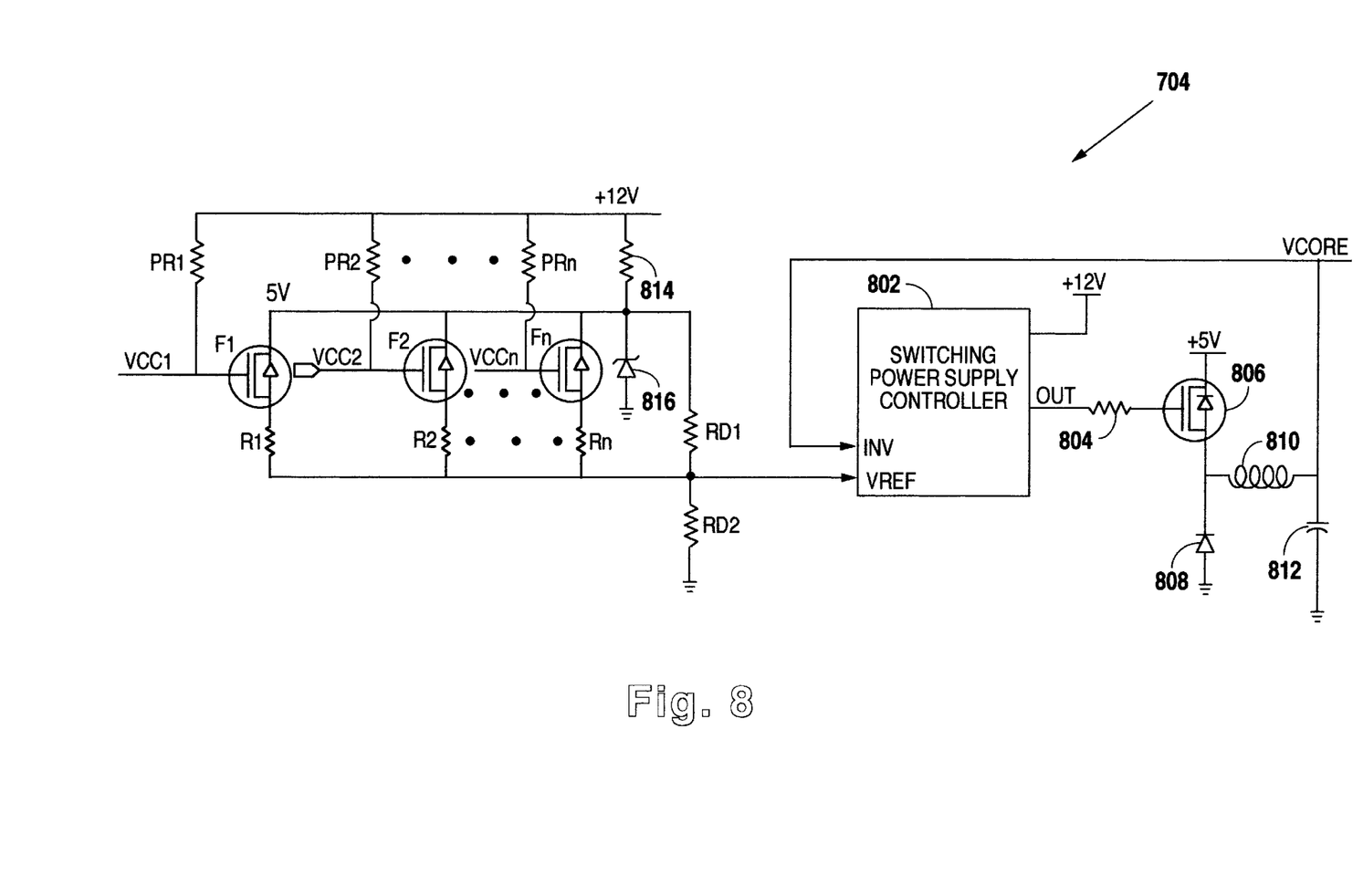
FIG. 8 is a more detailed schematic diagram of the programmable power supply of FIG. 7.

FIG. 8 is a more detailed schematic diagram of the programmable power supply 704 of FIG. 7. The power supply 704 preferably includes a switching power supply controller 802, such as a UC3824 device or the like. The VCORE signal is provided to a feedback input INV of the controller 802, which also receives a reference voltage VREF at a VREF input for determining the voltage level asserted at its output, referred to as a signal OUT. Generally, the controller 802 asserts the OUT signal to follow the voltage of the VREF signal. The controller receives the +12V signal for providing operating power. The OUT signal is provided to one end of a current limit resistor 804, having its other end coupled to the gate of a FET 806, which is preferably an n-channel enhancement MOSFET or the like. The source of the FET 806 receives the +5V signal, and the drain of the FET 806 is coupled to the cathode of a diode 808 and to one end of a choke inductor 810. The anode of the diode 808 is coupled to ground, and the other end of the inductor 810 asserts the VCORE signal and is coupled to one end of a capacitor 812, having its other end coupled to ground. The resistor 804 is preferably 15Ω, the inductor 810 is preferably 14 microhenries ($\mu$H) and the capacitor 812 is preferably 3000 microfarads ($\mu$F).

The +12V signal is provided to one end of a pullup resistor 814, having its other end coupled to the cathode of a precision five-volt Zener diode 816, which has its cathode coupled to ground. The cathode of the Zener diode 816 develops a five volt signal referred to as 5V, which is a separate and relatively independent signal from the +5V signal described previously. The 5V signal is provided to one end of a resistor RD1, having its other end providing the VREF signal and provided to one end of another resistor RD2. The other end of the resistor RD2 is coupled to ground. The resistors RD1 and RD2 establish a voltage divider of the 5V signal for developing the VREF signal.

The +12V signal is also provided to one end each of one or more pullup resistors PR1, PR2, ... PRn, where the other end of the resistor PR1 is coupled to the gate of a FET F1, the other end of the resistor PR2 is coupled to the gate of a FET F2, ..., and the other end of the resistor PRn is coupled to the gate of a FET Fn. The FETs F1, F2, ... Fn, are each preferably n-channel enhancement MOSFETs or the like. The drains of the FETs F1–Fn, receive the 5V signal, and the source of the FET F1 is coupled to one end of a resistor R1, the source of the FET F2 is coupled to one end of a resistor R2, ..., and the source of the FET Fn is coupled to one end of a resistor Rn. The other end of each of the resistors R1–Rn is coupled to the junction between the resistors RD1 and RD2 for modifying the VREF signal, as described further below. The gate of the FET F1 receives a signal VCC1, the gate of the FET F2 receives a signal VCC2, ..., and the gate of the FET Fn receives a signal VCCn, where the VCC1–VCCn signals are part of the core voltage control signals from the device configuration circuit 720. In particular, the core voltage control signals from the device configuration circuit 720 includes a VCC signal for each of the parallel FETs and resistors. The value n is any integer value to achieve the desired number of different voltage levels for the VCORE signal. In particular, any one or any combination of the FETs F1–Fn are turned on to place one or more of the corresponding resistors R1–Rn in parallel with the resistor RD1, to thereby modify the VREF signal.

Operation of the programmable power supply 704 is as follows. The resistors RD1 and RD2 establish an initial minimum voltage level of the VREF signal, which establishes an initial minimum operating voltage level of the device 502 through the VCORE signal. The device configuration circuit 720 initially asserts the VCC1–VCCn signals low, thereby turning off all of the FETs F1–Fn. The device configuration circuit 720 then asserts none, one or any combination of the VCC1–VCCn signals high, or open-circuited, to enable the corresponding FET(s) F1–Fn, to be turned on. For example, if the VCC1 signal is open-circuited, the corresponding pullup resistor PR1 pulls the gate of the FET F1 high, thereby turning it on. The FET F1 being turned on places the resistor R1 in parallel with the resistor RD1. In this manner, any one or more or any combination of the resistors R1–Rn are placed in parallel with the resistor RD1. This effectively lowers the resistance and voltage across the resistor RD1, which correspondingly increases the VREF signal. The values of the resistors RD1, RD2 and R1–Rn are chosen to proper voltage division of the 5V signal to achieve the desired operating voltages of the VREF, and thus the VCORE signals. The range of the VCORE signal is preferably between 2.5V and 4V or 5V, although any particular voltage levels and ranges are a matter of design choice.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

We claim:

1. A power supply system for detecting an operating configuration of a device and for providing a corresponding operating voltage to the device, comprising:
    a frequency determination circuit for asserting a frequency signal indicative of the operating frequency of the device;
    a device configuration circuit receiving said frequency signal and receiving a plane configuration signal indicative of a plane configuration of the device, said device configuration circuit for asserting control signals based on said frequency plane configuration signals to correspond to one of a plurality of predetermined operating voltage levels; and
    a configurable power supply that receives said control signals and that provides an operating voltage having a level corresponding to said control signals.

2. The power supply system of claim 1, wherein said configurable power supply comprises:
    a switching power supply controller receiving a variable reference signal and providing said operating voltage to correspond to said variable reference signal;
    a voltage divider receiving a first reference signal for providing said variable reference signal; and
    an array of switching devices coupled to said voltage divider and receiving said control signals for modifying said variable reference signal according to said control signals.

3. The power supply system of claim 2, wherein said configurable power supply further comprises:
    a voltage reference device receiving an independent power signal and providing said first reference signal.

4. The power supply system of claim 2, wherein:
    said voltage divider comprises a resistive voltage divider; and
    said array of switching devices includes:
        a plurality of resistors switchably coupled to said resistive voltage divider; and
        a plurality of transistors, each coupled to a corresponding one of said plurality of resistors and receiving a corresponding control signal for coupling said corresponding one of said plurality of resistors to said resistive voltage divider.

5. The power supply system of claim 4, wherein said resistive voltage divider asserts said variable reference signal at an initial value corresponding to a predetermined low voltage level for operating the device.

6. The power supply system of claim 4, wherein:
    said resistive voltage divider includes first and second resistors, said first resistor having a first end receiving said first reference signal and a second end coupled to one end of said second resistor at a junction, said junction providing said variable reference signal;
    each of said plurality of resistors having a first end coupled to said junction and a second end; and
    each of said plurality of transistors having a current path coupled between a second end of a corresponding one of said plurality of resistors and said first end of said first resistor of said resistive voltage divider, and a control terminal receiving said corresponding control signal.

7. The power supply system of claim 6, wherein each of said plurality of transistors comprises a field-effect transistor.

8. The power supply system of claim 1, wherein said frequency determination circuit comprises a speed jumper block.

9. The power supply system of claim 8, wherein said speed jumper block includes a plurality of jumper slots, each of said plurality of jumper slots corresponding to one of a plurality of predetermined frequencies.

10. The power supply system of claim 9, wherein each of said plurality of jumper slots asserts a signal indicative of one of said plurality of predetermined frequencies.

11. The power supply system of claim 1, wherein said signal indicative of a plane configuration of the device indicates whether the device is a split-plane device and whether the device is a uni-plane device.

12. The power supply system of claim 11, wherein the device provides said signal indicative of a plane configuration of the device to said device configuration circuit.

13. The power supply system of claim 1, wherein said device configuration circuit asserts a signal indicative of a multiple of said signal indicative of the operating frequency of the device.

14. A power supply system, comprising:
    a processor;
    a frequency determination circuit for asserting a frequency signal indicative of the operating frequency of said processor;

a device configuration circuit receiving said frequency signal and receiving a plane configuration signal indicative of a plane configuration of said processor, said device configuration circuit for asserting control signals based on said frequency and plane configuration signals to correspond to one of a plurality of predetermined operating voltage levels of said processor; and a configurable power supply that receives said control signals and that provides an operating voltage to said processor having a level corresponding to said control signals.

15. The power supply system of claim 14, wherein said configurable power supply comprises:

a switching power supply controller receiving a variable reference signal and providing said operating voltage to correspond to said variable reference signal;

a voltage divider receiving a first reference signal for providing said variable reference signal; and an array of switching devices coupled to said voltage divider and receiving said control signals for modifying said variable reference signal according to said control signals.

16. The power supply system of claim 14, wherein said frequency determination circuit comprises a speed jumper block.

17. The power supply system of claim 14, wherein said signal indicative of a plane configuration of said processor indicates whether said processor is a split-plane device and whether said processor is a uni-plane device.

18. The power supply system of claim 17, wherein said processor provides said signal indicative of a plane configuration of said processor to said device configuration circuit.

19. A method of detecting an operating configuration of a device and for asserting a corresponding operating voltage to the device, comprising the steps of:

detecting a frequency of operation of the device;

detecting a plane configuration of the device; and asserting an operating voltage to the device having a level determined by the operation frequency and the plane configuration of the device.

20. The method of claim 19, wherein said step of detecting a plane configuration comprises the steps of:

providing first and second operating voltages to a first and a second portion, respectively, of the device; and comparing a voltage of said first portion with a reference signal upon power up.

21. The method of claim 19, wherein said step of asserting an operating voltage to the device comprises the steps of:

asserting the operating voltage at an initial low voltage level; and asserting the operating voltage at one of a matrix of voltage levels based on the operation frequency and the plane configuration.

* * * * *